United States Patent
Yoshikawa et al.

(10) Patent No.: US 7,433,125 B2
(45) Date of Patent: *Oct. 7, 2008

(54) LIGHT QUANTITY DISTRIBUTION CONTROL ELEMENT AND OPTICAL APPARATUS USING THE SAME

(75) Inventors: Motonobu Yoshikawa, Osaka (JP); Yoshiharu Yamamoto, Toyonaka (JP); Yasuhiro Tanaka, Nishinomiya (JP); Michihiro Yamagata, Osaka (JP); Hiroshi Yamaguchi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/812,414

(22) Filed: Jun. 19, 2007

(65) Prior Publication Data

US 2007/0258148 A1 Nov. 8, 2007

Related U.S. Application Data

(62) Division of application No. 10/973,616, filed on Oct. 27, 2004, now Pat. No. 7,239,448.

(30) Foreign Application Priority Data

Oct. 27, 2003 (JP) ............................ 2003-366428

(51) Int. Cl.
*G02B 5/18* (2006.01)

(52) U.S. Cl. .................. 359/569; 359/575; 359/900
(58) Field of Classification Search ................ 359/569, 359/571, 572, 575, 900
See application file for complete search history.

(56) References Cited

U.S. PATENT DOCUMENTS

| 5,995,286 | A | 11/1999 | Mukai et al. |
| 7,064,899 | B2 | 6/2006 | Te Kolste et al. |
| 7,075,722 | B2 | 7/2006 | Nakai |
| 7,094,452 | B2 | 8/2006 | Yamashita et al. |
| 2004/0257553 | A1 | 12/2004 | Totzeck |
| 2007/0024975 | A1 | 2/2007 | McGrew |

FOREIGN PATENT DOCUMENTS

| JP | 8-160338 | 6/1996 |
| JP | 2001-290093 | 10/2001 |
| JP | 2002-221605 | 8/2002 |

*Primary Examiner*—Fayez G Assaf
(74) *Attorney, Agent, or Firm*—McDermott Will & Emery LLP

(57) ABSTRACT

A light quantity distribution control element includes a substrate of 20 mm×20 mm×3 mm made of a material that transmits light, such as optical glass or acryl, and a antireflective structure provided on a surface of the substrate. As the antireflective structure, a conical antireflective structure of a pitch of 0.15 μm (periodic structure having conical convexities) is formed. This corresponds to a antireflective structure having a pitch of a wavelength or less in the ultraviolet band (150 nm to 400 nm) at the time when ultraviolet light is used as incident light.

20 Claims, 12 Drawing Sheets

LIGHT QUANTITY DISTRIBUTION CONTROL ELEMENT AND OPTICAL APPARATUS USING THE SAME

RELATED APPLICATIONS

This application is a divisional of application Ser. No. 10/973,616, filed on Oct. 27, 2004, which claims priority of Japanese Application No. 2003-366428, filed Oct. 27, 2003, the contents of which are hereby incorporated by reference.

BACKGROUND

1. Technical Field

The disclosed concepts relate to a light quantity distribution control element and a light quantity distribution control lens used preferably to correct non-uniform light quantity in optical scanning devices or the like, and an information recording/reproducing apparatus, an image pickup device and an optical scanning device using the same, and an image-forming apparatus using the optical scanning device.

2. Description of the Background Art

A number of optical scanning devices used in laser beam printers or the like include a semiconductor laser as a light source, a first imaging optical system for imaging light flux from the light source linearly on a rotary polygon mirror in order to correct the pyramidal error of the rotary polygon mirror, a polygon mirror as the rotary polygon mirror and a second imaging optical system for imaging uniform spots at a constant velocity on a photoconductor drum, which is a surface to be scanned.

In a conventional optical scanning device, an effective aperture in the main scanning direction is provided before the polygon mirror, and this is a underfilled type in which a line image that is smaller than the width in the main scanning direction of the deflection reflective surface of the polygon mirror is formed. However, in order to increase the number of the deflection reflective surface of the polygon mirror, it is necessary to increase the inner diameter and thus it is difficult to increase the speed. Therefore, optical scanning devices of overfilled type in which a line image larger than that in the main scanning direction of the deflection reflective surface of the polygon mirror is formed and the deflection reflective surface of the polygon mirror is used as the effective aperture in the main scanning direction have been proposed. However, in such a case, the width of the defection reflective surface of the polygon mirror is smaller than the width of the light flux having a spatial intensity distribution, so that the light quantity directed to the periphery is smaller than the light quantity directed to the vicinity of the center in the longitudinal direction of the photoconductor drum. Therefore, the light quantity on the photoconductor drum becomes non-uniform, so that it is difficult to obtain high quality recorded images.

Therefore, methods for correcting non-uniformity of light quantity have been proposed, such as a method of providing a filter for cutting by coating a portion having a strong beam intensity distribution with a metal film between the light source and the polygon mirror, and a method of coating a fθ lens so as to provide a transmittance distribution such that the light quantity distribution becomes uniform (e.g., see JP8-160338A and JP2001-290093A)

However, with the above-described configurations, the cost is increased and variation in light quantity also is increased.

SUMMARY

Therefore, with the foregoing in mind, the disclosed concepts present an inexpensive light quantity distribution control elements that can correct light non-uniformity of light quantity properly, and an optical apparatus using the same such like an information recording/reproducing apparatus, an image pickup device and an optical scanning device, and an image-forming apparatus using the optical scanning device.

The present invention has the following features to attain the object mentioned above. A first aspect of the present invention is directed to an optical element for controlling a light quantity includes a substrate; an antireflective structure includes a plurality of antireflective elements provided on a surface of the substrate, wherein heights of the antireflective elements differ in accordance with portions of the surface on which the antireflective elements are respectively placed.

A first aspect of the present invention is directed ton optical apparatus includes an optical element for controlling a light quantity, the optical element has a substrate, an antireflective structure includes a plurality of antireflective elements provided on a surface of the substrate, wherein heights of the antireflective elements differ in accordance with portions of the surface on which the antireflective elements are respectively placed.

A light quantity distribution control that can correct the non-uniformity in the light quantity properly can be realized simply by varying the convex height in the antireflective structure, depending on the incident region of the light, so that the transmittance varies depending on the incident region of the light. As a result, light quantity distribution control elements that are suitably used to correct the non-uniformity in the light quantity in an optical scanning device or the like properly can be provided. Then, when an image-forming apparatus is configured by using an optical scanning device on which the light quantity distribution control element or the light quantity distribution control lens is mounted, high quality recorded image can be obtained. Furthermore, when information is reproduced with an information recording/reproducing apparatus, using the light quantity distribution control element or the light quantity distribution control lens, optimal recording/reproduction of information can be performed. Moreover, when an image pickup device is constituted by using the light quantity distribution control element or the light quantity distribution control lens, high quality imaging with reduced non-uniformity in light quantity can be performed.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, the novel concepts will be described more specifically by way of embodiments.

First Embodiment

Figure 1A:
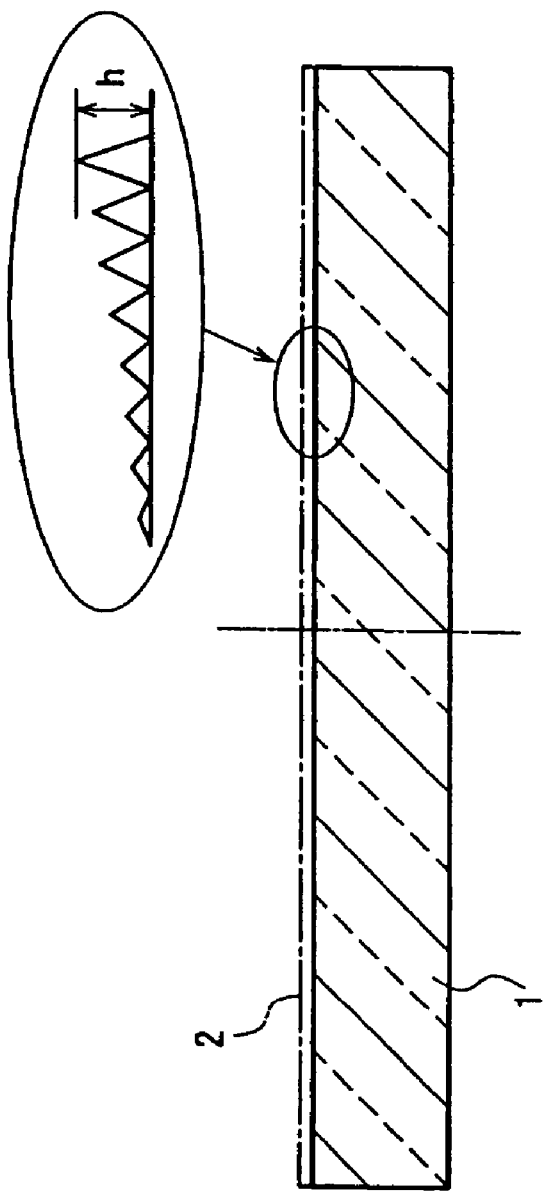
FIG. 1A is a schematic cross-sectional views showing a light quantity distribution control element in a first embodiment.
Figure 1B:
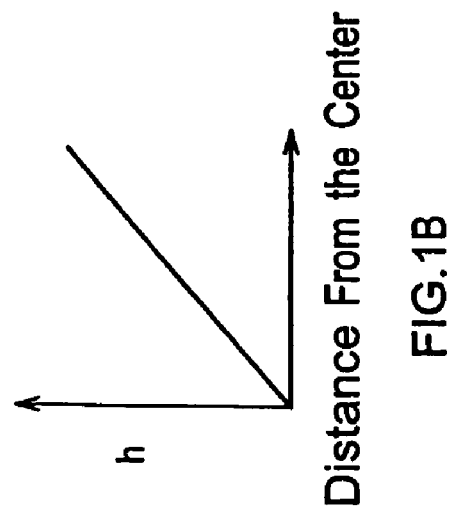
FIG. 1B is a graph showing a height distribution of an antireflective structure in a first embodiment.
Figure 2:
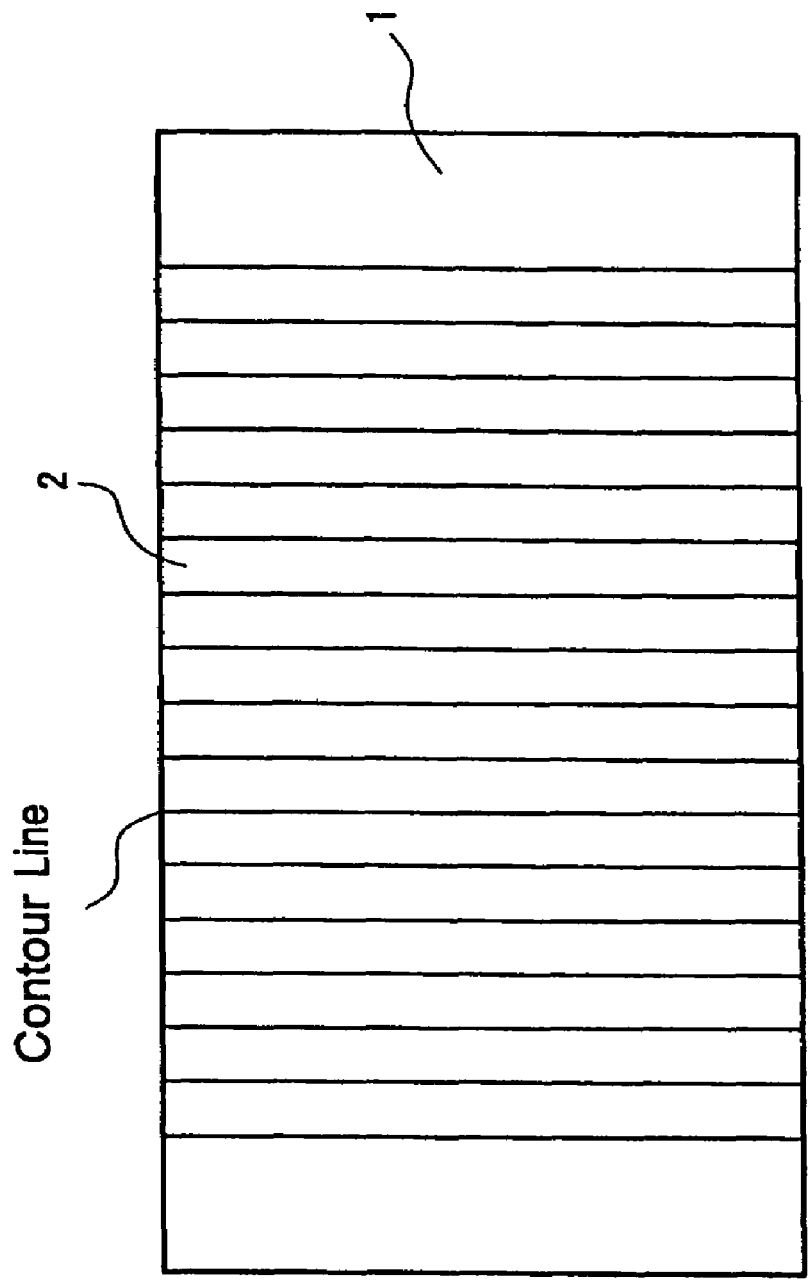
FIG. 2 is a schematic diagram showing the lines of equal convex height in a antireflective structure constituting the light quantity distribution control element in the first embodiment.
Figure 3:
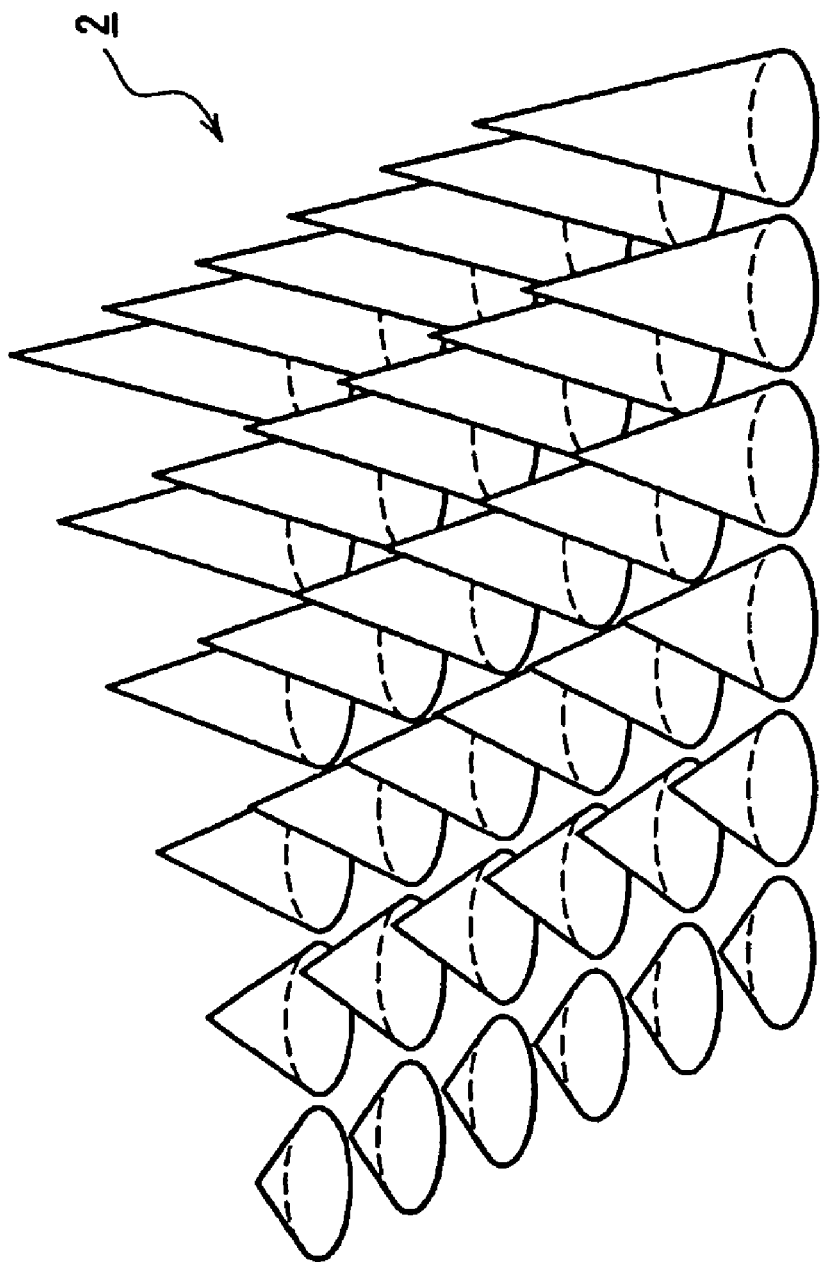
FIG. 3 is a schematic perspective view showing the antireflective structure constituting the light quantity distribution control element in the first embodiment.

FIG. 1A is a schematic cross-sectional view showing a light quantity distribution control element in a first embodiment. And FIG. 1B is a graph showing a height distribution of an antireflective structure in a first embodiment. FIG. 2 is a schematic diagram showing the lines of equal convex height in a antireflective structure constituting the light quantity distribution control element. FIG. 3 is a schematic perspective view showing the antireflective structure constituting the light quantity distribution control element.

As shown in FIGS. 1 to 3, the light quantity distribution control element of this embodiment includes a substrate 1 of 20 mm×20 mm×3 mm made of a material that transmits light, such as quartz, acryl and polycarbonate, and an antireflective structure 2 provided on a surface of the substrate 1. In this embodiment, a conical antireflective structure (periodic structure having conical convexities) of a pitch of 0.15 µm is formed as the antireflective structure 2. This corresponds to a antireflective structure having a pitch of a wavelength in the ultraviolet band (150 nm to 400 nm) or less at the time when ultraviolet light is used as the incident light.

The convex height h of the antireflective structure 2 varies depending on the transmission region of light on the surface of the substrate 1 so that the transmittance varies depending on the transmission region of the light. In this embodiment, the antireflective structure 2 is configured such that the convex height h gradually increases continuously from the vicinity of the center to the right and the left outermost portions on the surface of the substrate 1. In other words, the convex height h of the antireflective structure 2 is set so as to be symmetrical (plane symmetry) with respect to the plane that is perpendicular to the line that traverses the center of the surface of the substrate 1 and is orthogonal to the longitudinal direction of the substrate 1. More specifically, the convex height h of the antireflective structure 2 in the vicinity of the center of the surface of the substrate 1 is 0.015 µm, and the convex height h of the antireflective structure 2 in the outermost portion (right and left end portions) on the surface of the substrate 1 is 0.15 µm. This corresponds to a antireflective structure in which the maximum value of the aspect ratio, which is the ratio of the pitch and the convex height h, is 1 or more (in the case of this embodiment, the aspect ratio at the right and left end portions on the surface of the substrate 1 is 0.15 µm/0.0.15 µm=1), and the minimum value of the aspect ratio is 0.1 or less (in the case of this embodiment, the aspect ratio in the vicinity of the center of the surface of the substrate 1 is 0.015 µm/0.15 µm=0.1). The difference in the transmittance can be increased by setting the maximum value of the aspect ratio to 1 or more, and the minimum value of the aspect ratio to 0.1 or less.

The light quantity distribution control element of this embodiment can be produced, for example, in the following manner. Using a master mold the shape of the pressing surface of which has been processed precisely into a shape identical to the antireflective structure 2, heated and softened glass is press-molded, so that a mold for molding the antireflective structure made of glass is produced. Then, using the mold for molding the antireflective structure, the substrate 1 made of a material that transmits light is press-molded, so that a light quantity distribution control element can be produced.

As described above, the light quantity distribution control element of this embodiment is configured by providing the antireflective structure 2 in which the convex height h varies depending on the region on a surface of the substrate 1 made of a material that transmits light. Therefore, using this light quantity distribution control element, the transmittance of light can vary depending on the region. In this embodiment, in particular, the antireflective structure 2 is configured such that the convex height h is gradually increased from the vicinity of the center to the outermost portions on the surface of the substrate 1, and therefore the transmittance can be increased as approaching the outermost portions.

In this embodiment, as the antireflective structure 2, a conical antireflective structure having a pitch of 0.15 µm, that is, a antireflective structure having a pitch of a wavelength in the ultraviolet band (150 nm to 400 nm) or less is formed, but depending on the purpose of use, a antireflective structure having a pitch of a wavelength in the visible band (400 nm to 700 nm) or less, a antireflective structure having a pitch of a wavelength in the near infrared band (700 nm to 2 µm) or less or a antireflective structure having a pitch of a wavelength in the far infrared band (2 µm to 13 µm) or less can be used.

This embodiment has been described by taking as an example the conical antireflective structure as the antireflective structure 2, but is not limited to such a structure, and for example, a quadrangular pyramid, a regular hexagonal pyramid can be used. The shape of the convexity of the antireflective structure is not limited to a cone, but cylindrical or prismatic shapes, or shapes having a rounded point can be used. The antireflective structure 2 can be any structure, as long as the convex height h varies depending on the transmission region of light so that the transmittance varies depending on the transmission region of light.

Figure 4A:
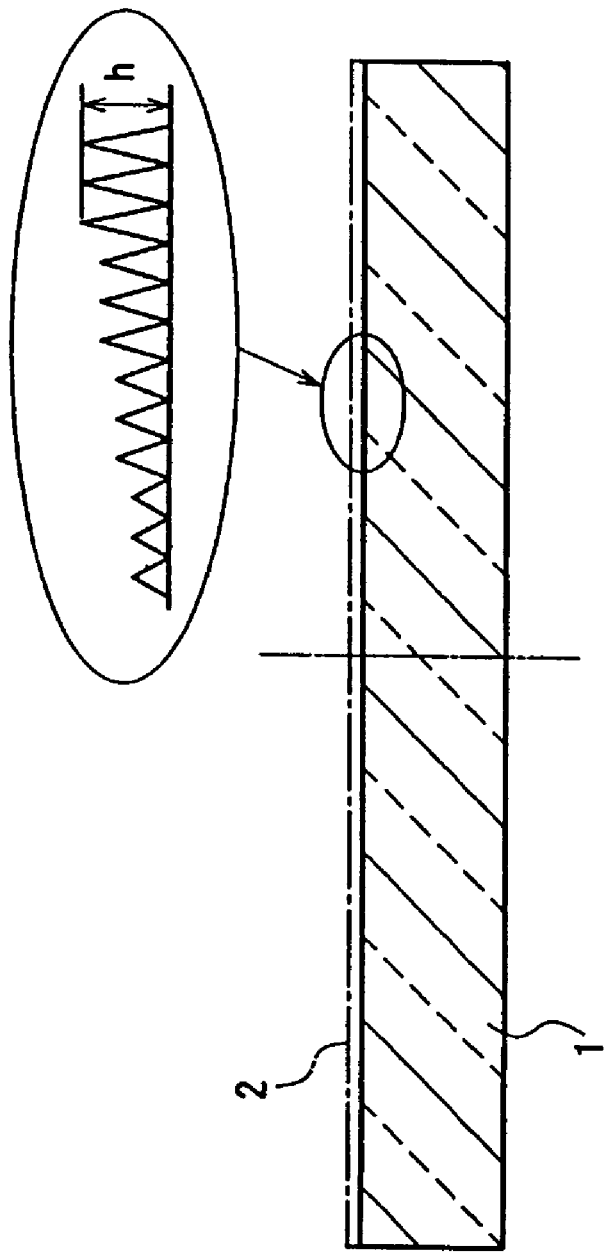
FIG. 4A is schematic cross-sectional views showing another example of a light quantity distribution control element in the first embodiment.
Figure 4B:
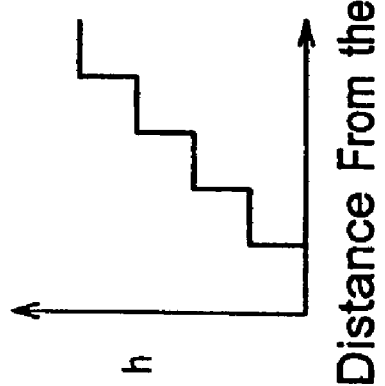
FIG. 4B is a graph showing another example of a height distribution of an antireflective structure in a first embodiment.

In this embodiment, the convex height h of the antireflective structure 2 is configured so as to be changed continuously, but the present invention is not limited to this structure, and for example, as shown in FIG. 4, the convex height h of the antireflective structure 2 can be changed with regions having a predetermined area. FIG. 4A is schematic cross-sectional views showing another example of a light quantity distribution control element in the first embodiment. And FIG. 4B is a graph showing another example of a height distribution of an antireflective structure in a first embodiment. In particular, in FIG. 4, the convex height h of the antireflective structure 2 is configured so as to increase from the vicinity of the center to the outermost portions on the surface of the substrate 1 in the stepwise manner.

Figure 5:
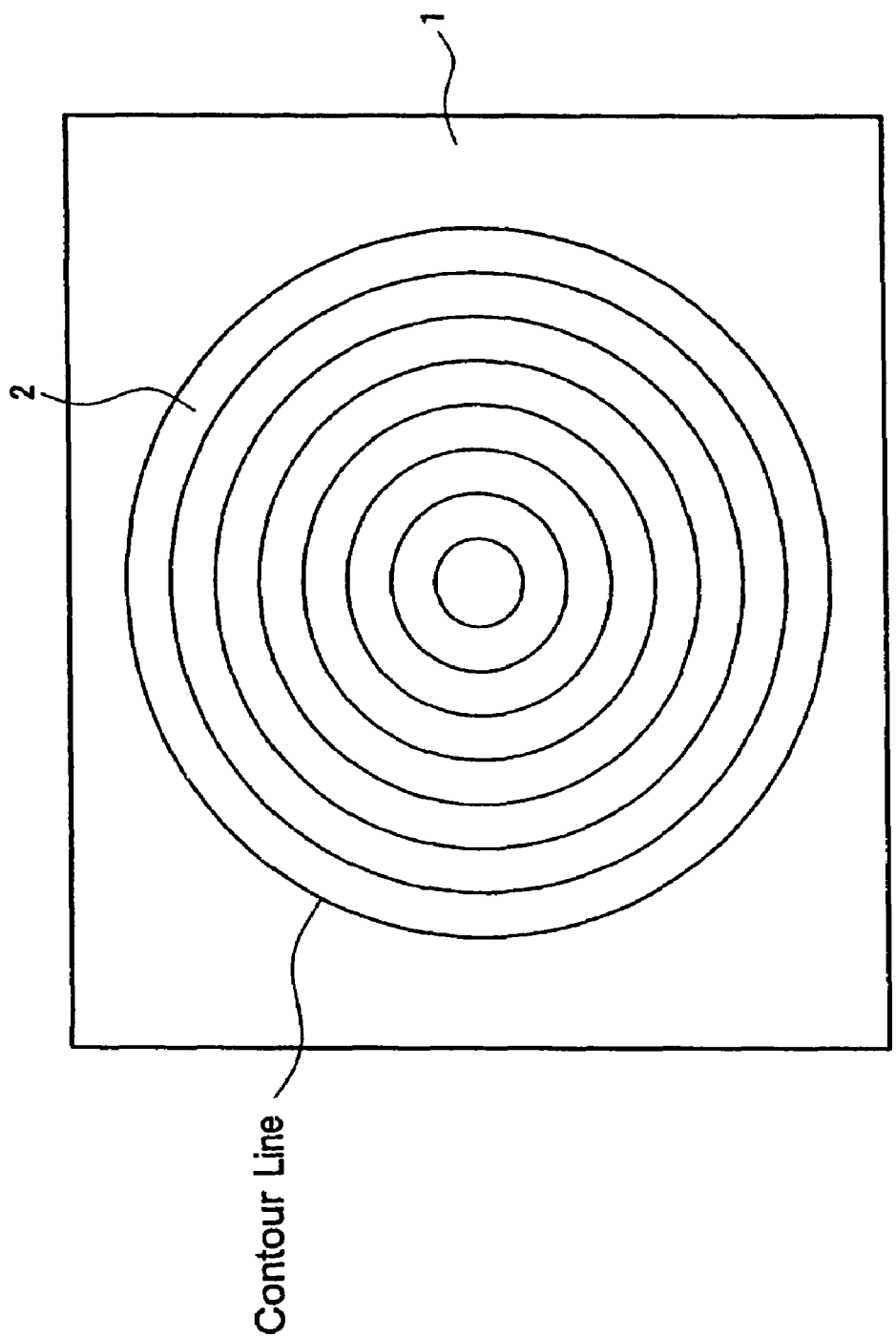
FIG. 5 is a schematic diagram showing the lines of equal convex height in another antireflective structure constituting the light quantity distribution control element in the first embodiment.
Figure 6:
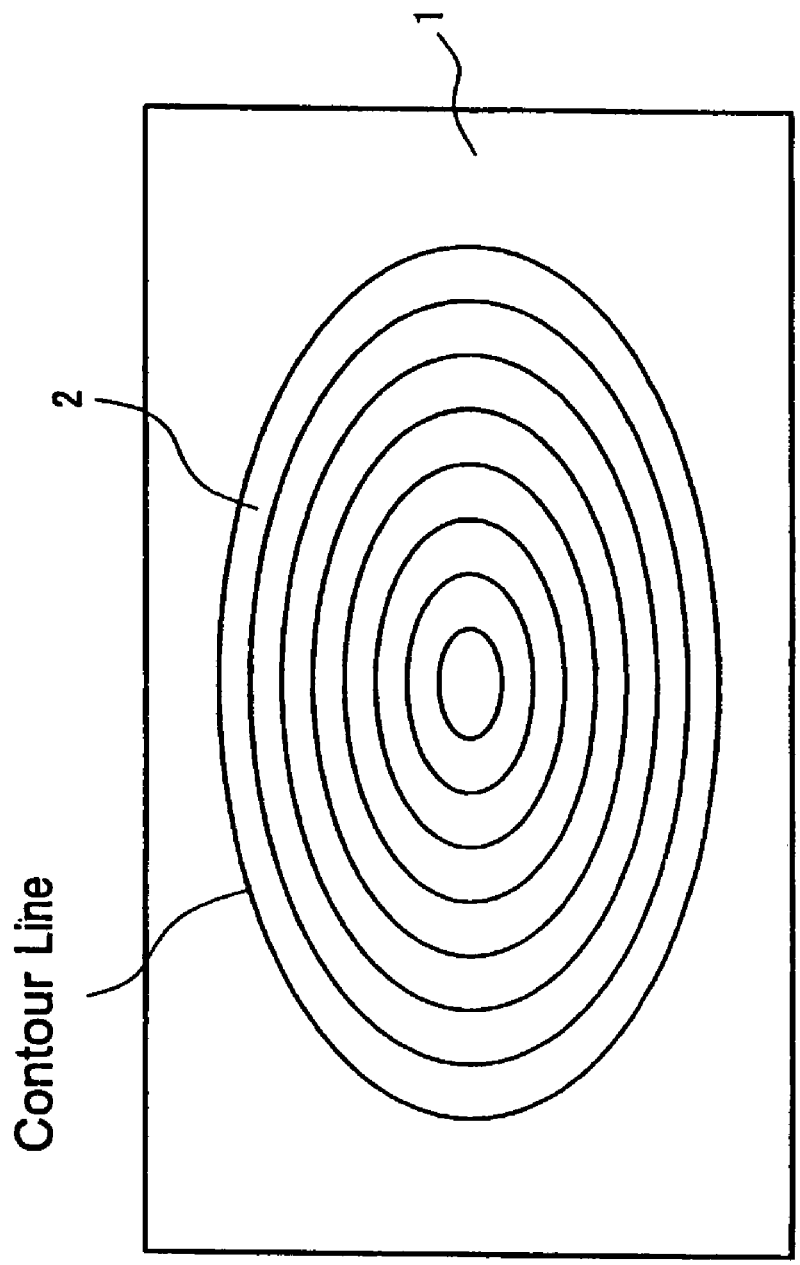
FIG. 6 is a schematic diagram showing the convexities having the same height in still another antireflective structure constituting the light quantity distribution control element in the first embodiment.

This embodiment has been described by taking as an example the case where the convex height h of the antireflective structure 2 is set so as to be plane symmetrical, but is not limited to this structure. For example, as shown in FIG. 5, the convex height h of the antireflective structure 2 can be set so as to be symmetrical (axis symmetry) with respect to the axis that traverses the center of the surface of the substrate 1 and is perpendicular to the surface of the substrate 1. Furthermore, as shown in FIG. 6, the convex height h of the antireflective structure 2 can be set so as to be symmetrical (plane symmetry) with respect to two planes that are perpendicular to respective lines that traverse the center of the surface of the substrate 1 and are along the longitudinal direction and the direction orthogonal to the longitudinal direction, respectively, of the substrate 1.

This embodiment has been described by taking a rectangular solid-shaped substrate as an example of the substrate 1, but the shape of the substrate 1 is not limited to a rectangular solid. For example, a disk-shaped, cylindrical or polygonal prism-shaped substrate can be used.

Second Embodiment

Figure 7A:
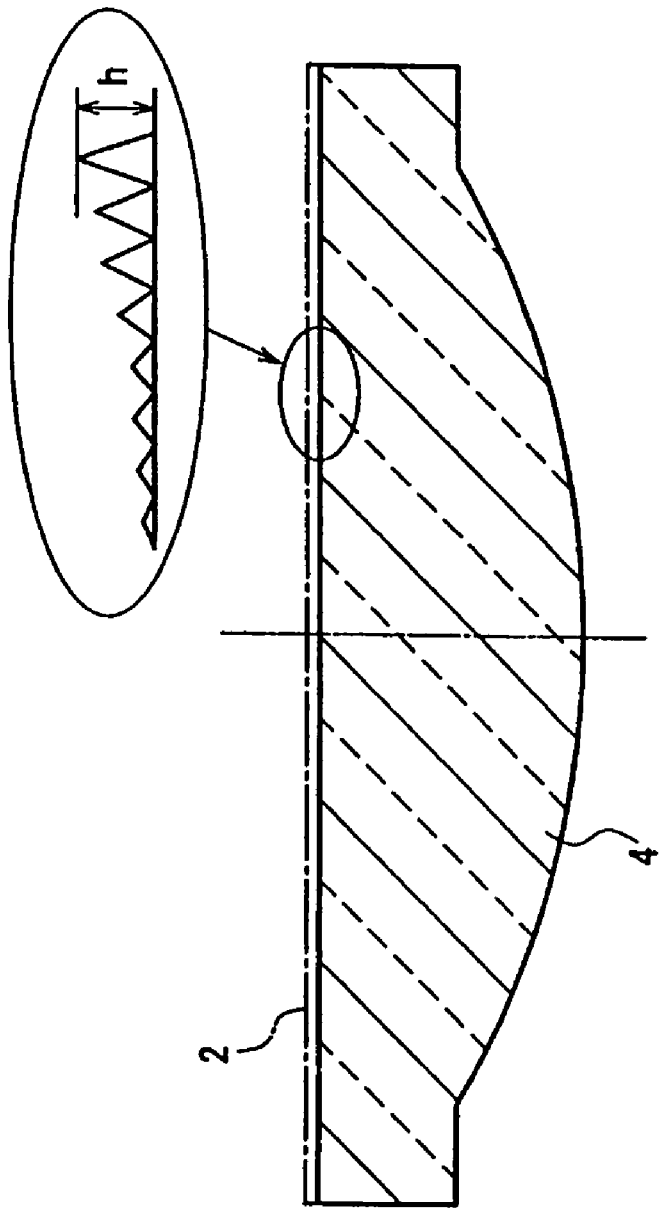
FIG. 7A is schematic cross-sectional views showing a light quantity distribution control lens in a second embodiment.

FIG. 7A is a schematic cross-sectional view showing a light quantity distribution control lens in the second embodiment. And FIG. 7B is a graph showing a height distribution of an antireflective structure in a second embodiment.

Figure 7B:
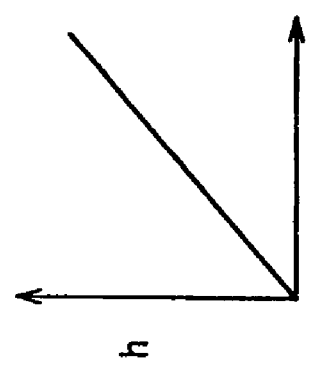
FIG. 7B is a graph showing a height distribution of an antireflective structure in a second embodiment.

As shown in FIGS. 7A and 7B, the light quantity distribution control lens of this embodiment includes a plano-convex lens 4 having an effective diameter of 20 mm and made of an optical glass, resin or the like as a lens main body, and a antireflective structure 2 provided on the smooth surface of the plano-convex lens 4.

As the antireflective structure 2, the same structures as described in the first embodiments can be used. In other words, the antireflective structure 2 has a structure in which the convex height h varies depending on the transmission region of light. With this as the basis, the antireflective structure 2 can be configured in various embodiments as described in the first embodiments.

The light quantity distribution control lens of this embodiment can be produced, for example, in the following manner. Using a master mold the shape of the pressing surface of which has been processed precisely into a shape identical to the antireflective structure 2, heated and softened glass is press-molded, so that a mold for molding the antireflective structure made of glass is produced. Then, using the mold for molding the antireflective structure, a lens material is press-molded, so that a light quantity distribution control lens can be produced.

As described above, the light quantity distribution control lens of this embodiment is configured by providing the antireflective structure 2 in which the convex height h varies depending on the region. Therefore, the transmittance of light can vary depending on the region.

In this embodiment, the antireflective structure 2 is provided on the smooth surface of the plano-convex lens 4, but the antireflective structure 2 may be provided on the convex surface.

This embodiment has been described by taking the plano-convex lens 4 as an example of the lens main body, but the lens main body is not limited to the plano-convex lens. For example, a double convex lens, a concave lens or any other lenses can be used.

Third Embodiment

Figure 8:
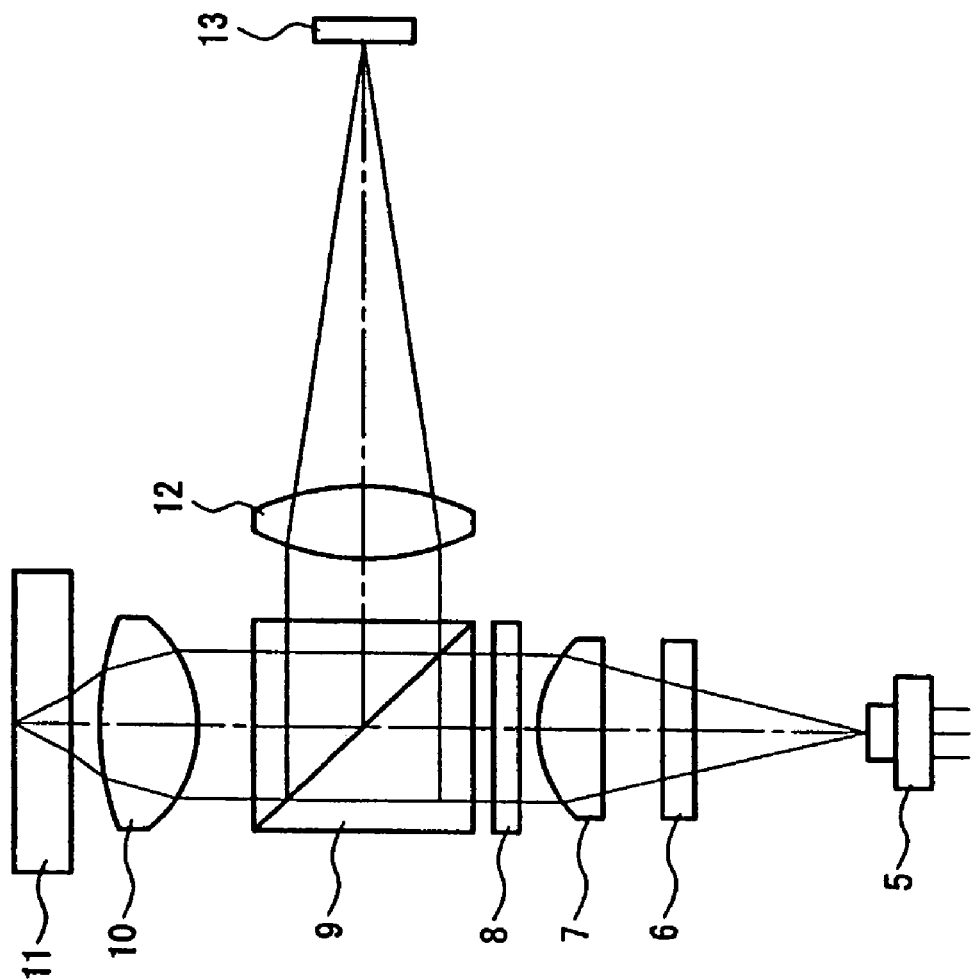
FIG. 8 is a schematic structural view showing an information recording/reproducing apparatus in a third embodiment.

FIG. 8 is a schematic structural view showing an information recording/reproducing apparatus in the third embodiment.

As shown in FIG. 8, the information recording/reproducing apparatus in the third embodiment includes a semiconductor laser 5 that emits laser light as a light source. The laser light emitted by the semiconductor laser 5 passes through a diffraction grating 6 and then is let be collimated light by a collimator lens 7. This collimated light passes through a light quantity distribution control element 8 as described in the first embodiment and a beam splitter 9, and then is focused on an optical disk 11 as an information carrier by an optical lens 10 as focusing means.

The reflected light from the optical disk 11 passes through the objective lens 10 again and becomes collimated light, and thereafter the traveling direction is changed by 90 degrees by the beam splitter 9 and the light is incident to a light-receiving element 13 with a detection lens 12.

In the case where the light quantity distribution control element 8 is not provided, in the light quantity distribution on the pupil plane in the objective lens 10, the light quantity ratio of the peripheral portion to the central portion in the pupil diameter is low, so that the light is focused into a light spot having a large diameter on the optical disk 11. Consequently, optimal recording/reproducing of information is difficult.

Therefore, in this embodiment, the light quantity distribution control element 8 described in the first embodiment is provided on an optical path leading from the semiconductor laser 5 to the objective lens 10. The light quantity distribution control element 8 has a antireflective structure 2 in which the convex height h is set so as to be symmetrical (axis symmetry) with respect to the axis that traverses the center of the surface of the substrate 1 and is perpendicular to the surface of the substrate 1 (see FIG. 5), and to be gradually increased continuously from the vicinity of the center of the surface of the substrate 1 to the peripheral portions. Thus, the transmittance of the light quantity distribution control element 8 is increased as approaching the peripheral portion, and the light quantity ratio of the peripheral portion to the central portion in the pupil diameter of the objective lens 10 can be increased. Consequently, the diameter of the light spot that is focused on the optical disk 11 can be small, and thus optimal recording/reproducing of information can be performed.

In this embodiment, the light quantity distribution control element 8 described in the first embodiment is provided on an optical path leading from the semiconductor laser 5 to the objective lens 10. However, instead of providing the light quantity distribution control element 8, the light quantity distribution control lens described in the second embodiment can be used as the objective lens 10. Also in this case, the same effect as above can be obtained. More specifically, the antireflective structure 2 in which the convex height h is set so as to be symmetrical (axis symmetry) with respect to the optical axis and to be gradually increased continuously from the vicinity of the center to the peripheral portions can be formed on one surface of the objective lens 10.

Fourth Embodiment

Figure 9:
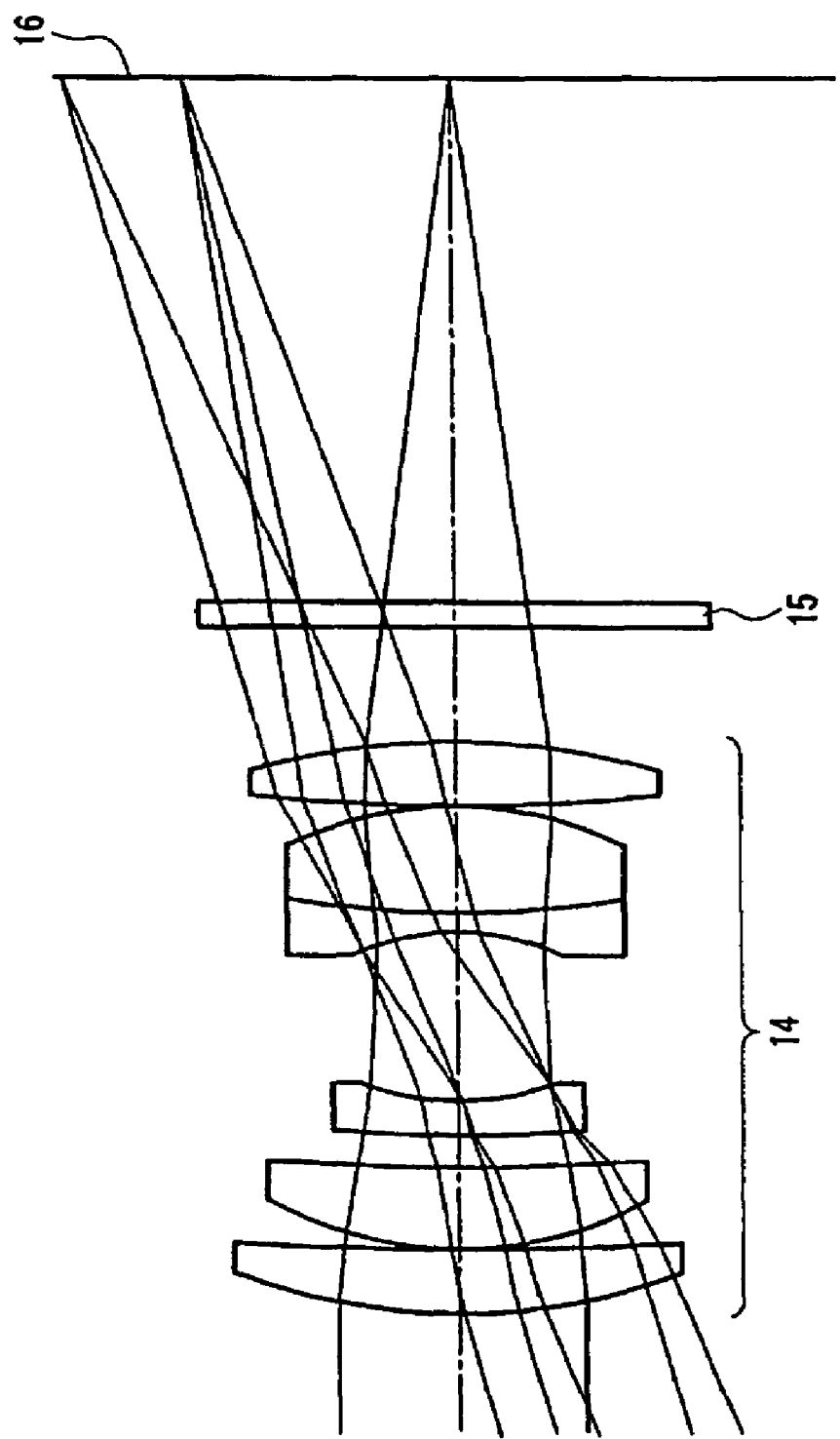
FIG. 9 is a schematic structural view showing an image pickup device in a fourth embodiment.

FIG. 9A is a schematic structural view showing an image pickup device in the fourth embodiment As shown in FIG. 9, the image pickup device of this embodiment includes a zoom lens 14 as an image pickup optical system, a light quantity distribution control element 15 as described in the first embodiment, an image pickup element 16 that are arranged sequentially from the object side (on the left side in FIG. 9) to the image surface side (on the right side in FIG. 9). Then, the light flux from the zoom lens 14 is subjected to photoelectric exchange in the image pickup element 16.

Herein, if the light quantity distribution control element 15 is not provided, a difference is made between the light quantity of the central image height and the light quantity of the peripheral image height, because of the vignetting by the outline of the lens or the difference in the incident angle to the image pickup element 16, which results in non-uniformity in the light quantity.

In this embodiment, the light quantity distribution control element 15 as described in the first embodiment is provided between the zoom lens (image pickup optical system) 14 and a solid-state image pickup element 16. The light quantity distribution control element 15, similarly to the third embodiment, a antireflective structure 2 is used in which the convex height h is set so as to be symmetrical (axis symmetry) with respect to the axis that traverses the center of the surface of the substrate 1 and is perpendicular to the surface of the substrate 1 (see FIG. 5), and to be gradually increased continuously from the vicinity of the center of the surface of the substrate 1 to the peripheral portions. In this case, the pitch in the antireflective structure 2 is set to be a wavelength or less of the light flux that is subjected to photoelectric exchange in the image pickup element 16. Thus, high quality imaging with reduced non-uniformity in the light quantity can be achieved.

In this embodiment, the light quantity distribution control element 15 as described in the first embodiment is provided between the zoom lens (image pickup optical system) 14 and a solid-state image pickup element 16. However, instead of providing the light quantity distribution control element 15, the light quantity distribution control lens described in the second embodiment can be included in a part of the zoom lens (image pickup optical system) 14. More specifically, the antireflective structure 2 in which the convex height h is set so as to be symmetrical (axis symmetry) with respect to the optical axis and to be gradually increased continuously from the vicinity of the center to the peripheral portions can be formed on one surface of a lens of a part of the zoom lens (image pickup) 14. Also in this case, the pitch in the antireflective structure 2 is set to be a wavelength or less of the light flux that is subjected to photoelectric exchange in the image pickup element 16, and thus the same effect as above can be obtained.

Fifth Embodiment

Figure 10:
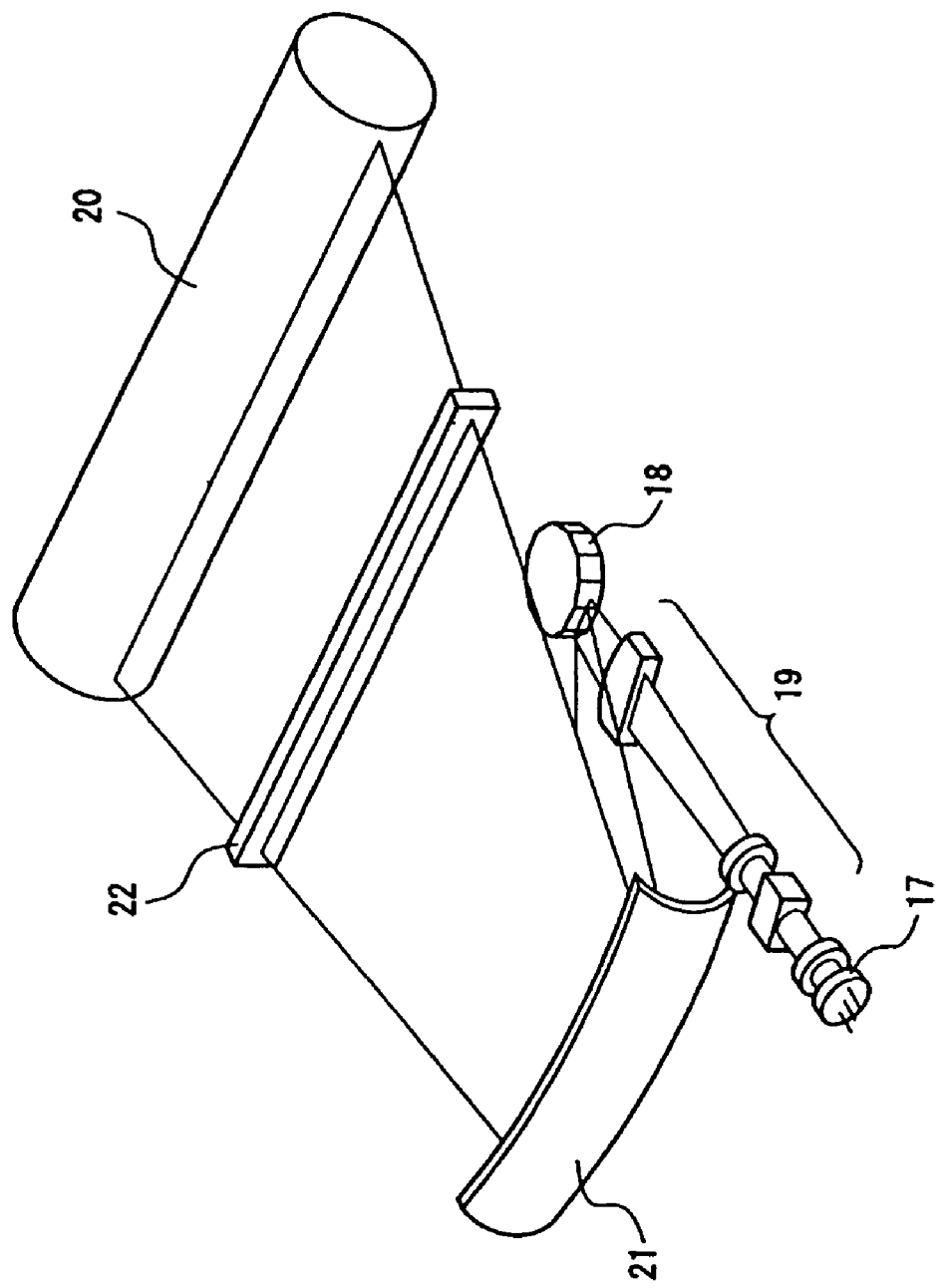
FIG. 10 is a schematic perspective view showing an optical scanning device in a fifth embodiment.

FIG. 10 is a schematic perspective view showing an optical scanning device in the fifth embodiment.

As shown in FIG. 10, reference numeral 17 denotes a semiconductor laser as a light source portion that emits a light flux of a wavelength λ (e.g., 780 nm); reference numeral 18 denotes a polygon mirror as a rotary polygon mirror that scans the light flux from the semiconductor laser 17; and reference numeral 19 denotes is a first imaging optical system that guides the light flux from the semiconductor laser 17 to the deflection reflective surface of the polygon mirror 18. In this case, the light flux from the semiconductor laser 17 is incident to the polygon mirror 18 in the so-called "overfilled" state in which in the main scanning direction, the width of the light flux is larger than the width in the main scanning direction of the deflection reflective surface of the polygon mirror 18. Reference numeral 20 denotes a photoconductive drum as a surface to be scanned, reference numeral 21 denotes a curved mirror that is provided between the polygon mirror 18 and the photoconductive drum 20, and serves as a second imaging optical system for guiding the light flux from the polygon mirror 18 onto the photoconductive drum 20. A light quantity distribution control element 22 as described in the first embodiment is provided between the curved mirror 21 and the photoconductive drum 20. The second imaging optical system is configured with the curved mirror 21, so that without an expensive glass lens, high resolution and high reliability can be realized.

Herein, if the light quantity distribution control element 22 is not provided, the light quantity in the periphery may be decreased, compared with the light quantity in the vicinity of the center in the longitudinal direction of the photoconductive drum 20, and the light quantity distribution on the photoconductive drum 20 may be non-uniform.

Therefore, in this embodiment, a light quantity distribution control element 22 as described in the first embodiment is provided between the curved mirror 21 and the photoconductive drum 20. The light quantity distribution control element 22 has a antireflective structure 2 in which the convex height h is set so as to be left-right symmetrical (plane symmetry) with respect to a plane perpendicular to a line that traverses the center of the surface of the substrate 1 and is orthogonal to the longitudinal direction of the substrate 1 (see FIG. 2), and to be gradually increased continuously from the vicinity of the center of the surface of the substrate 1 to the peripheral portions on the left and the right (see FIG. 1). In this case, the pitch in the antireflective structure 2 is set to be a wavelength or less of the light flux that is emitted from the semiconductor laser 17. Thus, the transmittance of the light quantity distribution control element 22 is increased as approaching the outermost portions, and the light quantity distribution on the surface to be scanned (photoconductive drum 20) can be uniform.

Figure 11:
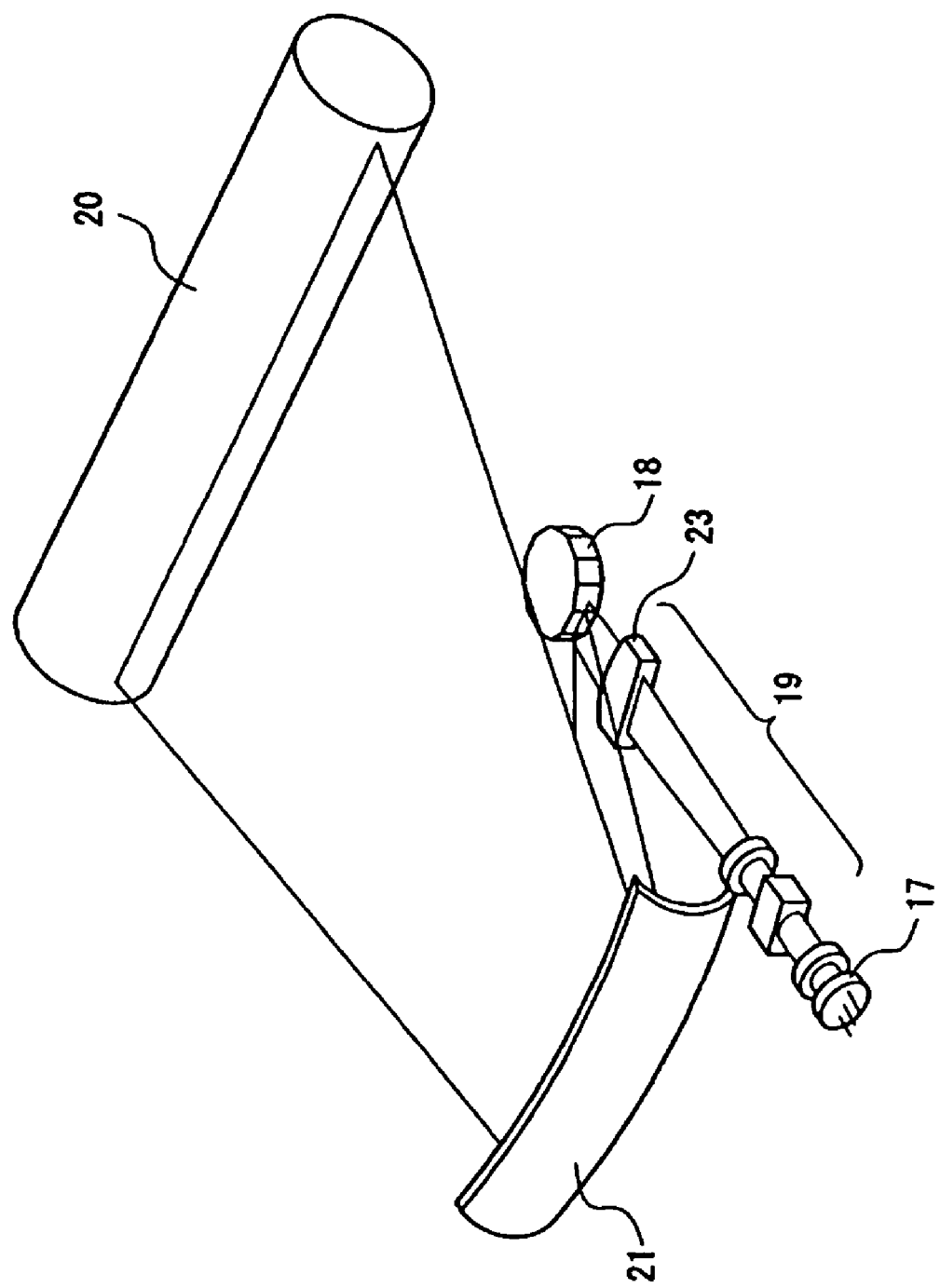
FIG. 11 is a schematic perspective view showing another example of the optical scanning device in the fifth embodiment.

In this embodiment, the light quantity distribution control element 22 as described in the first embodiment is provided between the curved mirror 21 and the photoconductive drum 20. However, instead of providing the light quantity distribution control element 22, for example, the light quantity distribution control lens described in the second embodiment can be used as a cylindrical lens 23 constituting the first imaging optical system 19 shown in FIG. 11. This cylindrical lens 23 is a lens for imaging the light flux emitted from the semiconductor laser 17 on the deflection reflective surface of the polygon mirror 18. Also in this case, the same effect as above can be obtained. More specifically, the antireflective structure 2 in which the convex height h is set so as to be left-right symmetrical (plane symmetry) with respect to a plane perpendicular to a line that traverses the center of the surface of the cylindrical lens 23 and is orthogonal to the longitudinal direction of the cylindrical lens 23 and to be gradually increased continuously from the vicinity of the center of the surface of the cylindrical lens 23 to the outermost portions on the left and the right can be formed on one surface of the cylindrical lens 23. Furthermore, also when the light quantity distribution control element 22 is included in a part of the first imaging optical system 19 shown in FIG. 11, the same effect as above can be obtained.

Sixth Embodiment

Figure 12:
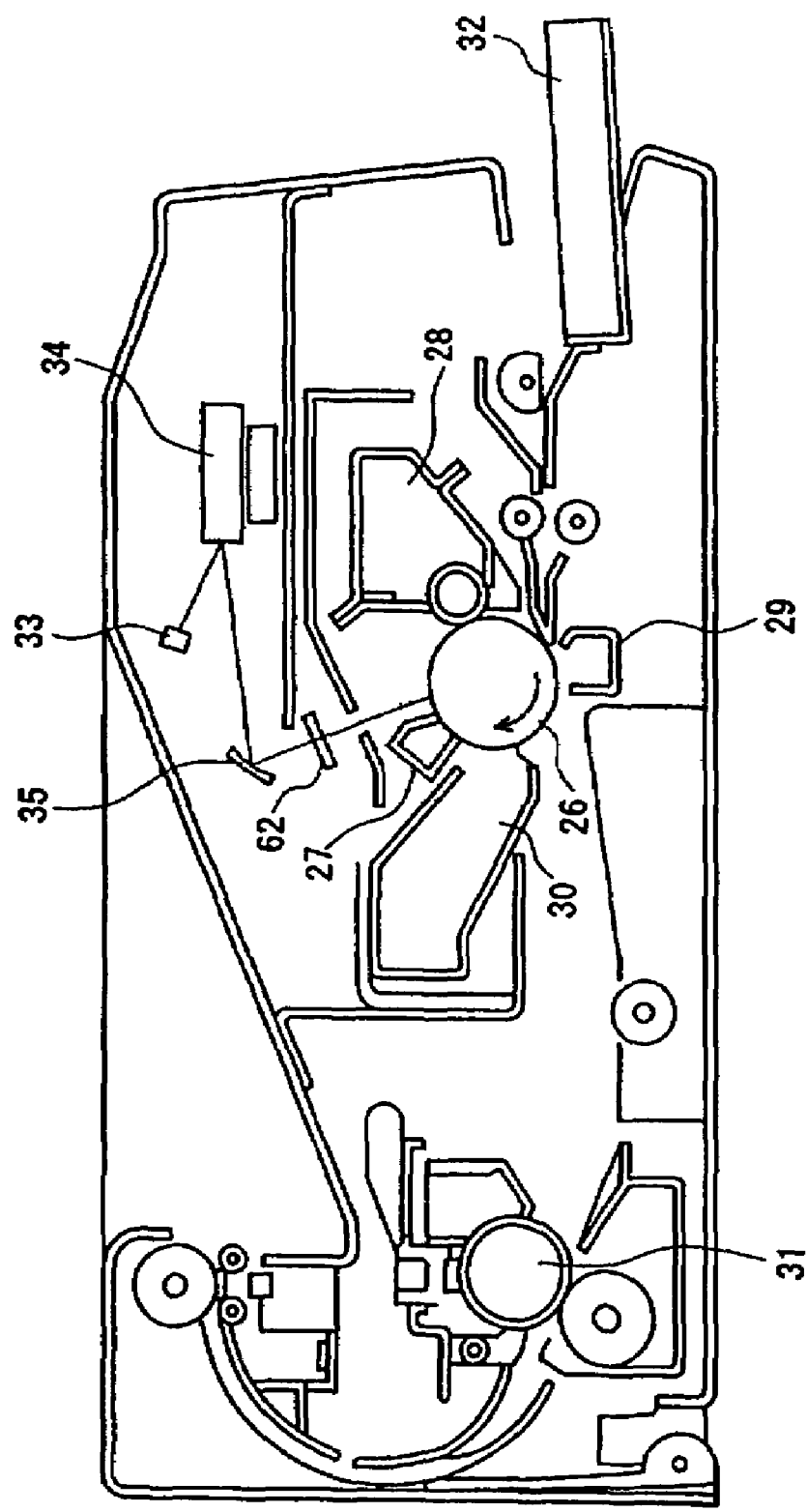
FIG. 12 is a schematic cross-sectional view showing an image-forming apparatus in a sixth embodiment.

FIG. 12 is a schematic cross-sectional view showing an image-forming apparatus in the sixth embodiment. As the optical scanning device of this image-forming apparatus, the optical scanning device described in the fifth embodiment is used.

In FIG. 12, reference numeral 26 denotes a photoconductive drum whose surface is covered with a photosensitive substance in which the electric charge is changed when being irradiated with light as a surface to be scanned; reference numeral 27 denotes a primary charger for charging the surface of the photoconductive drum 26 by attaching static electrical ions thereto; reference numeral 28 denotes a developer for attaching charging toner to a portion to be printed; reference numeral 29 denotes a transfer charger for transferring the attached toner to a sheet; reference numeral 30 denotes a cleaner for removing the remaining toner; and reference numeral 31 denotes a fixing apparatus for fixing the transferred toner to the sheet; and reference numeral 32 denotes a sheet feeding cassette. Reference numeral 33 denotes a light source block constituted by a semiconductor laser as a light source portion and a first imaging optical system; reference numeral 34 denotes a polygon mirror as a rotary-polygonal mirror; reference numeral 35 denotes a curved mirror; reference numeral 62 denotes a light quantity distribution control element as described in the first embodiment, and the light quantity distribution control element 62 is provided between the curved mirror 35 and the photoconductive drum 26. The light source block 33, the polygon mirror 34, the curved mirror 35, and light quantity distribution control element 62 can constitute the optical scanning device described in the fifth embodiment.

According to this embodiment, as the optical scanning device of the image-forming apparatus, the optical scanning device as described in the fifth embodiment is used, so that the transmittance of the light quantity distribution control element 62 is increased as approaching the outermost portions, and the light quantity distribution on the surface to be scanned (photoconductive drum 26) can be uniform. Thus, high quality recording image can be obtained.

In this embodiment as well as in the fifth embodiment, instead of providing the light quantity distribution control element 62, the light quantity distribution control lens described in the second embodiment may be used as a lens constituting the first imaging optical system.

Other Embodiment

Each embodiment explained above can be changed suitably. For example, an light quantity distribution control element is not only a light transmission element like a lens but a reflection light element like a mirror. Moreover, a light quantity distribution control element may be formed in one with the prism, the filter, etc. Furthermore, the distribution of the convex height is not restricted, but the distribution of the convex height of the concavo-convex structure of a light quantity distribution control element can be arbitrarily set up according to the characteristic demanded.

While the invention has been described in detail, the foregoing description is in all aspects illustrative and not restrictive. It is understood that numerous other modifications and variations can be devised without departing from the scope of the invention.

What is claimed is:

1. A method for controlling a light quantity through an optical element comprising a substrate having an optical surface without a periodic structure; and an antireflective structure including a plurality of antireflective elements provided on the optical surface of the substrate, the antireflective elements having a pitch equal to or less than a wavelength of the light to be controlled, wherein heights of the antireflective elements differ in accordance with portions of the optical surface on which the antireflective elements are respectively placed, said method comprising the step of:

varying the transmittance of light based on which region of the optical element the light passes through.

2. The method for controlling a light quantity of claim 1, wherein the heights of the antireflective elements gradually increase or decrease from a center portion of the surface to an outermost portion of the surface.

3. The method for controlling a light quantity of claim 1, wherein the substrate is made of a material for substantially transmitting light.

4. The method for controlling a light quantity of claim 1, wherein the substrate is made of a material for substantially reflecting light.

5. The method for controlling a light quantity of claim 1, wherein the antireflective structure has a maximum value of a ratio of a pitch and a height defined as aspect ratio of 1 or more.

6. The method for controlling a light quantity of claim 1, wherein the antireflective structure has a minimum value of a ratio of a pitch and a height defined as aspect ratio of 0.1 or less.

7. The method for controlling a light quantity of claim 1, wherein the antireflective structure has a periodic structure.

8. The method for controlling a light quantity of claim 1, wherein a height of the antireflective structure changes continuously.

9. The method for controlling a light quantity of claim 1, wherein a height of the antireflective structure varies with respect to regions having a predetermined area.

10. The method for controlling a light quantity of claim 1, wherein the height of the antireflective structure is increased form a vicinity of a center to outermost portions in a stepwise manner.

11. The method for controlling a light quantity of claim 1, wherein the height of the antireflective structure is plane symmetrical.

12. The method for controlling a light quantity of claim 1, wherein the height of the antireflective structure is axis symmetrical.

13. The method for controlling a light quantity of claim 1, wherein the substrate is a lens body.

14. The method for controlling a light quantity of claim 1, wherein the antireflective elements are polygonal pyramid structure.

15. The method for controlling a light quantity of claim 1, wherein the antireflective elements are conical structure.

16. The method for controlling a light quantity of claim 1, wherein the antireflective elements are a combination of polygonal pyramid structure and conical structure.

17. A method for controlling a light quantity in an optical apparatus having an optical element, said optical element comprising a substrate having an optical surface without a periodic structure; and an antireflective structure including a plurality of antireflective elements provided on the optical surface of the substrate, the antireflective elements having a pitch equal to or less than a wavelength of the light to be controlled, wherein heights of the antireflective elements differ in accordance with portions of the optical surface on which the antireflective elements are respectively placed, said method comprising the step of:

varying the transmittance of light based on which region of the optical element the light passes through.

18. The method for controlling a light quantity of claim 17, wherein the optical apparatus is an information recording/reproducing apparatus, and comprising:

an optical device for irradiating and focusing a light beam from a light source onto an information carrier, wherein the optical element is positioned on an optical path between the light source and the information carrier.

19. The method for controlling a light quantity of claim 17, wherein the optical apparatus is an image pickup device, and comprising:

an image pickup optical system and an image pickup element that are arranged from an object side to an image surface side in this order, wherein the optical element is positioned on an optical path between the image pickup optical system and the image pickup element.

20. The method for controlling a light quantity of claim 17, wherein the optical apparatus is an optical scanning device, and comprising:

a light source;

a scanner for scanning a light flux from the light source;

a first imaging optical system that is provided between the light source and the scanner;

a second imaging optical system that is provided between the scanner and a surface to be scanned for imaging the light flux onto the surface to be scanned.

* * * * *